UNITED STATES PATENT OFFICE.

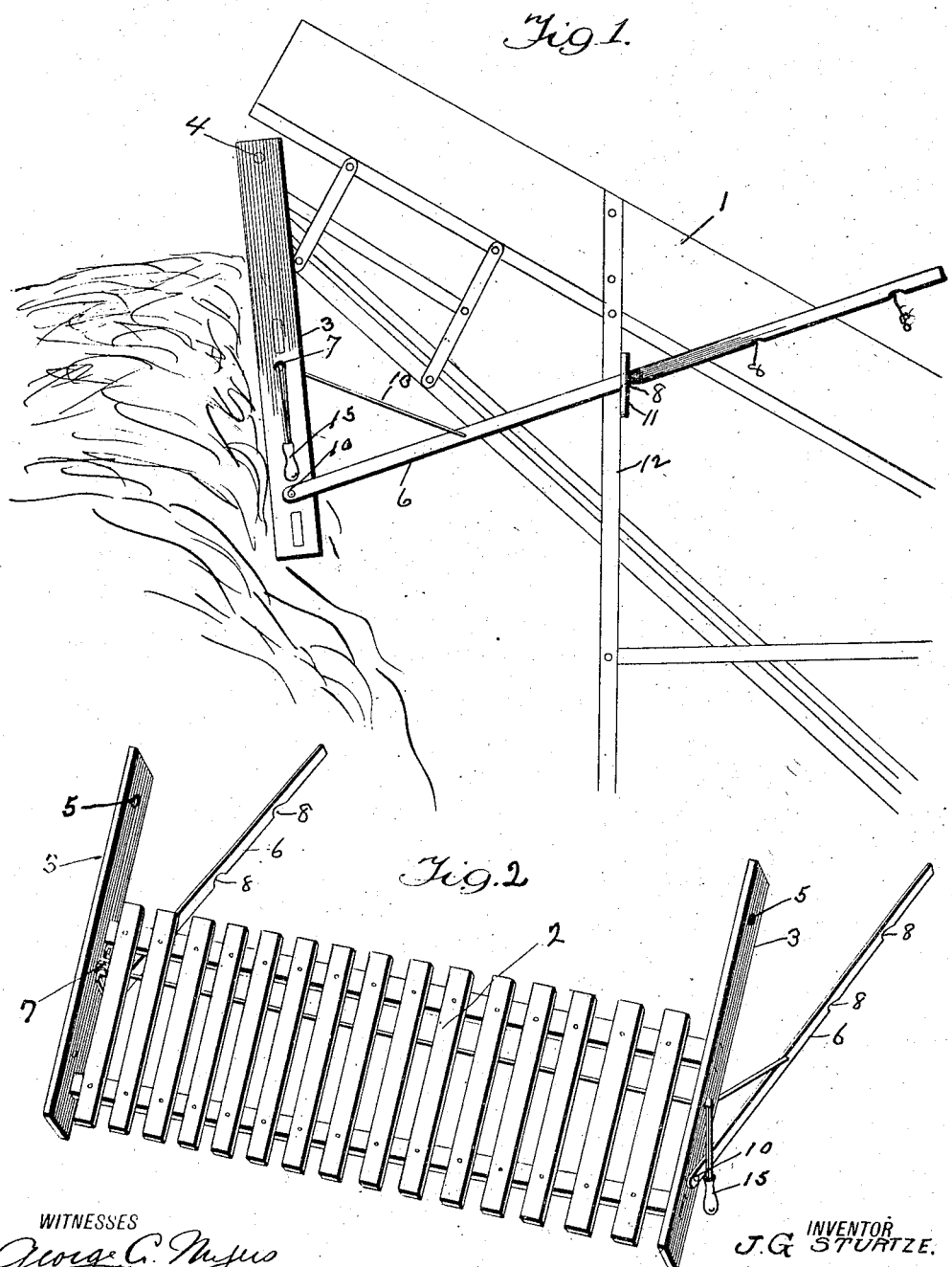

JOHN G. STURTZE, OF LOWVILLE, NEW YORK.

ADJUSTABLE PLATFORM FOR HAY-LOADERS.

1,352,996.  Specification of Letters Patent.  Patented Sept. 14, 1920.

Application filed September 4, 1919. Serial No. 321,571.

*To all whom it may concern:*

Be it known that I, JOHN G. STURTZE, a citizen of the United States, residing at Lowville in the county of Lewis and State of New York, have invented certain new and useful Improvements in Adjustable Platforms for Hay-Loaders; and I do hereby declare the following to be a full, clear, and exact description of the invention, such as will enable others, skilled in the art to which it appertains, to make and use the same, reference being had to the accompanying drawings, and to the letters and figures of reference marked thereon, which form a part of this specification.

This invention relates to new and useful improvements in an adjustable platform for hay loaders and has for its object a simple and efficient device of this character for use in preventing the hay, in passing up the inclined carrier of the loader, from being blown therefrom, and to insure the delivery of the hay to a proper position upon the hay wagon.

The invention comprises various other details of construction, combination and arrangement of parts which will be hereinafter fully described, shown in the accompanying drawings and then specifically defined in the appended claim.

My invention is illustrated in the accompanying drawings which, with the numerals of reference marked thereon, form a part of this application, and in which:

Figure 1 is a side view of the device, the same being shown as attached to the delivery end of a hay loader of ordinary construction, and Fig. 2 is an enlarged detail view in perspective of the device detached from the loader.

Reference now being had to the details of the drawings by numerals:

1 designates the side member of a hay loader of ordinary construction. The platform shown in Fig. 2 is preferably provided with spaced slats 2, and is of a width corresponding to the width of the hay loader, and is provided at its ends with end members 3, 3, one of which carries a pulley 7, and the other of which is provided with an opening 14. The platform at its upper end is hinged to a transverse shaft 4, which extends through the openings 5 provided adjacent the upper ends of the said side members, or bars, 3, so that normally the platform is held by gravity against the end of the load upon the hay wagon.

Pivotally connected at their lower ends to the side members, or bars, 3 of the platform are the struts 6, 6 provided at their lower edges with notches 8, engageable with keepers 11 upon the stanchions 12 to hold the platform in adjusted position. Each strut 6 is pivoted at one end to a stub shaft 10 carried by the lower end of the corresponding end bar 3 of the platform.

13 designates two cords, or chains, one end of each of which is secured to one of the struts 6. The cord attached to the strut 6, adjacent the end bar 3, which is provided with the opening 14, is passed through said opening and connected at its other end to a handle 15; the cord 13 secured to the other strut is passed over the pulley 7 on the other of said end bars 3 and is thence extended to the bar 3 having the opening 14, and passed through said opening and connected to the handle 15. In operation, the struts 6, 6 are released from engagement with the keepers 11 by pulling upon the common handle 15 connected to the ropes 13, thereby pulling upon said ropes to tilt, or rock, said struts out of engagement with said keepers. The platform is now moved by hand, the struts 6, 6 sliding through the keepers 11 and, when the platform is at the proper angle of adjustment, the notches of the struts 6, 6 are reëngaged with the keepers 11 to hold said platform in such adjusted position.

What I claim to be new is:

The combination with a hay loader of a platform pivotally connected at its upper end with the delivery end of said loader and including end bars, a pulley carried by one of said end bars and the other of said end bars having an opening, struts pivotally connected at one end thereof to said end bars and provided with notches on their under edges, keepers through which said struts are slidably projected and engageable with any one of said notches, cords secured at one end thereof to said struts intermediate the pivotal end thereof and said keepers, the cord secured to the strut adjacent the end bar having the opening being passed through said opening, the other of said cords attached to the other strut being passed over the pulley carried by the second end bar and thence extended through said opening of the first end bar, and a handle secured to the ends of said cords projecting through said openings.

In testimony whereof I hereunto affix my signature.

JOHN G. STURTZE.